Patented Dec. 14, 1943

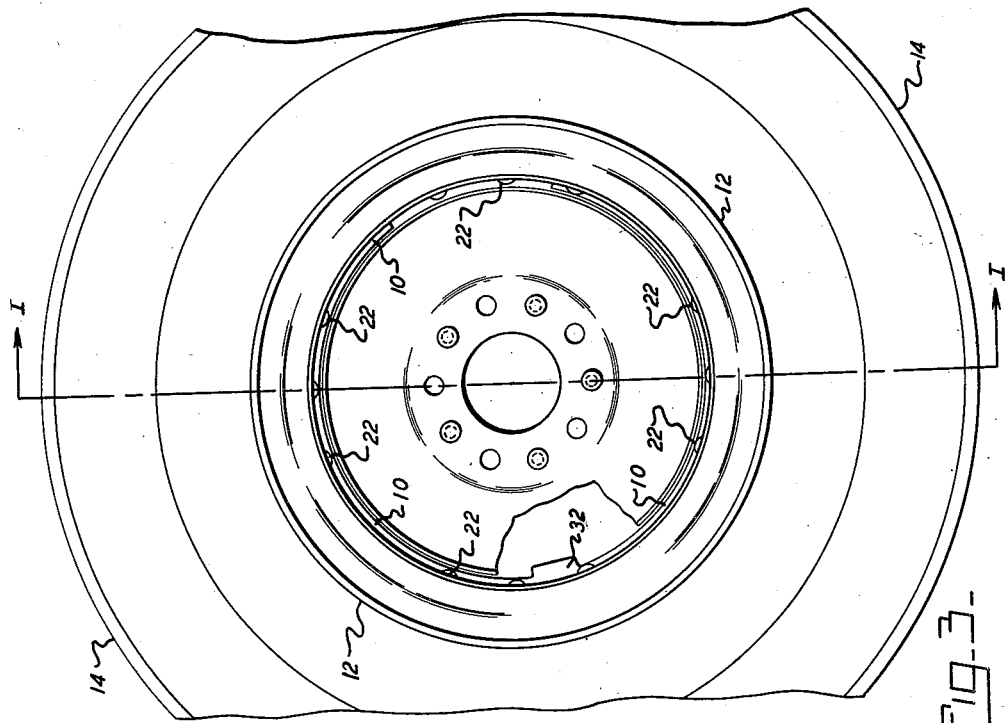
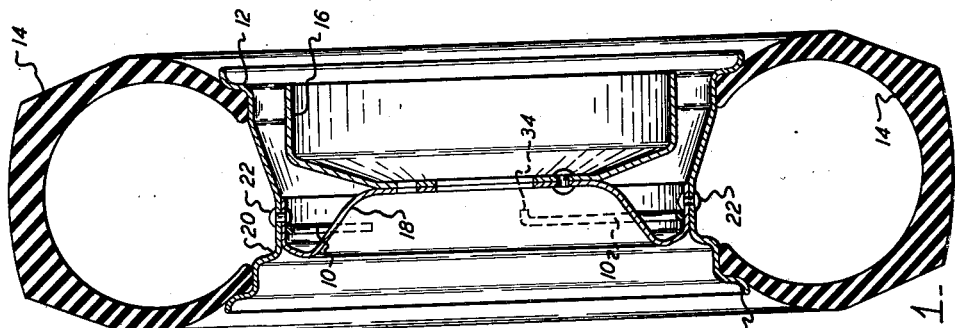
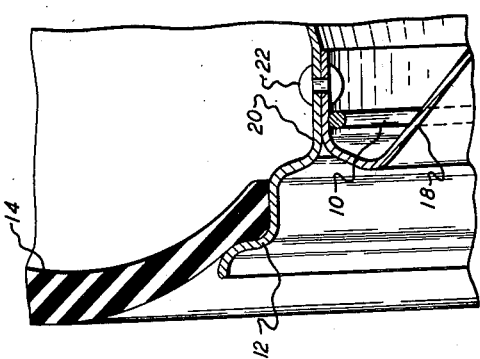

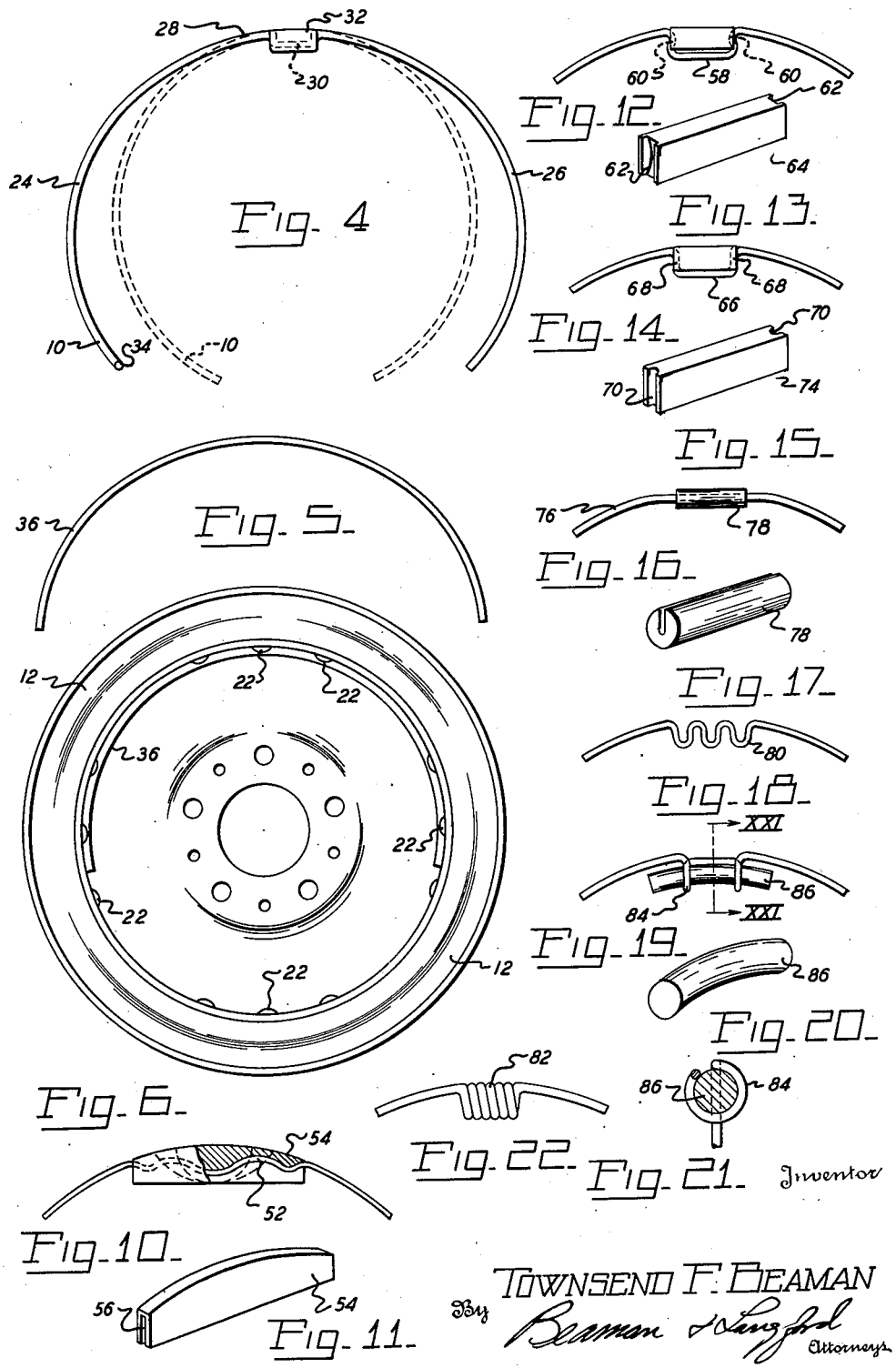

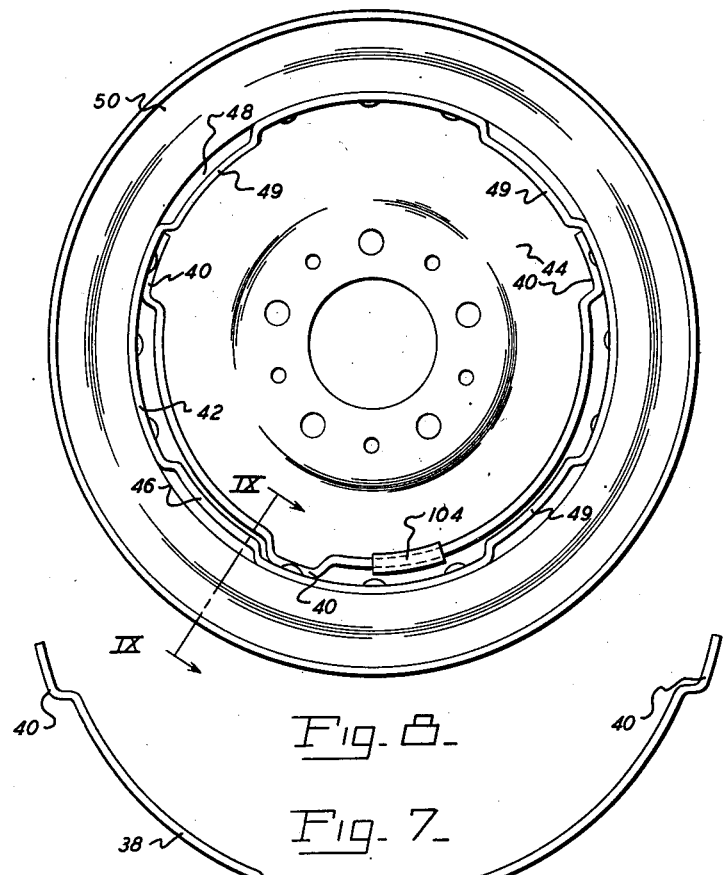
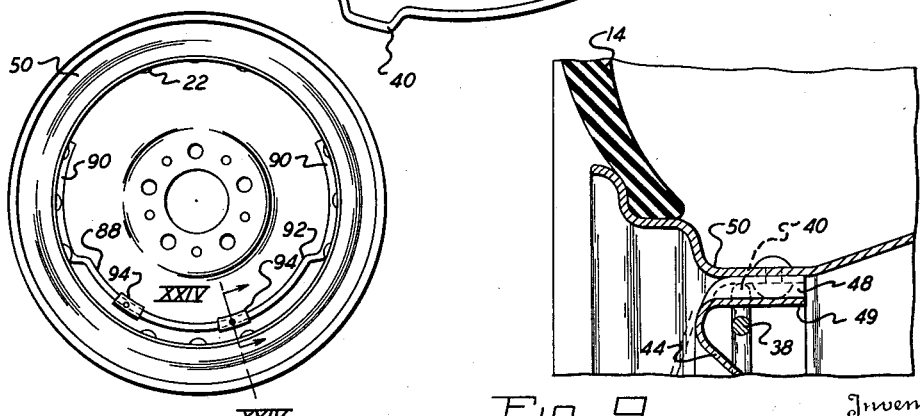
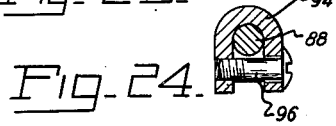

2,336,920

UNITED STATES PATENT OFFICE 2,336,920

WHEEL BALANCING RING

Townsend F. Beaman, Jackson, Mich.

Application July 28, 1941, Serial No. 404,285

5 Claims. (Cl. 301—5)

The present invention relates to improvements in means for balancing rotated bodies, and has particular reference to an improved balancing ring to be used in connection with the balancing of vehicle wheels and other bodies rotated at high speeds. Such a device is shown in the Bergstrom Patent No. 1,191,393, granted July 18, 1916.

At the present time vehicle wheels are being extensively balanced through the use of balance weights of the type disclosed in United States Patent No. 2,036,757, issued to James W. Hume. Balance weights of this type are unsightly with the result that it is the practice to attach the same on the inner side of the vehicle wheel out of sight. However, where more perfect dynamic balance conditions are desired, it is the practice to divide the weight required to statically balance the wheel between two rim weights and to attach the same on inner and outer flanges of the rim with the result that one or more of the rim weights will appear on the outside of the wheel where it may be observed.

According to the present invention, a balancing means for rotated bodies is provided which in its preferred form is in the nature of a spring ring adapted to be located within or upon an annular portion of the body to be balanced. In the balancing of wheels used upon automobiles, the construction of the present invention enables the balancing ring to be conveniently snapped in the plane of the dropped center of the rim where it is more correctly located for dynamic balance and is out of sight as viewed from the outside of the wheel. Other annular portions of the wheel structure and of other rotated bodies lend themselves to the convenient installation of the improved balancing means.

Thus, one object of the present invention is to provide a balancing means characterized by its ability to be sprung into position within or upon an annular portion or the equivalent of the body to be balanced.

Another object is to provide a balancing means for rotated bodies in the form of ring-like structure.

A further object is to provide balancing means for vehicle wheels and the like in the form of a split resilient ring.

A further object is to provide a balancing means for vehicle wheels and other rotated bodies in the form of a split resilient ring carrying a weighted body portion.

A still further object is to provide a balanced vehicle tire and wheel assembly including a drop-center rim and a resilient balancing ring that is snapped into position within an annulus of the wheel structure in a plane of the drop-center portion of the rim.

These and other objects and advantages residing in the present invention will become apparent and fully understood from a consideration of the following specification and annexed claims.

In the drawings wherein several modifications of the invention has been illustrated in connection with a vehicle wheel of the drop-center rim type, Fig. 1 is a cross-sectional view through a wheel and tire assembly showing the balancing ring in position, Fig. 2 is a fragmentary enlargement of the cross-sectional view shown in Fig. 1, Fig. 3 is a side elevational view of the wheel and tire assembly shown in Fig. 1 as viewed from the brake drum side of the assembly, Fig. 4 is a side elevational view of the balancing ring shown in Fig. 3, but removed from the wheel assembly, Fig. 5 is a view similar to Fig. 4 of a plain balancing ring with the weighted body omitted, Fig. 6 is a side elevational view of a wheel with the tire removed showing the ring of Fig. 5 in position, Fig. 7 is a view similar to Fig. 5 of a modified form of balancing ring for use with wheels having stamped spoke openings, Fig. 8 is a view similar to Fig. 6 showing the balancing ring of Fig. 7 in position, Fig. 9 is a cross-sectional view taken on line IX—IX of Fig. 8, Fig. 10 is a fragmentary side elevational view partly shown in broken cross-section of a balancing ring having one form of weighted body attached thereto, Fig. 11 is a perspective view of the weighted body shown in Fig. 10, Figs. 12 and 13 show another form of weighted body structure and are similar to Figs. 10 and 11, Figs. 14 and 15 show a further form of weighted body structure and are similar to Figs. 10 and 11, Figs. 16 and 17 show a still further form of the invention corresponding to Figs. 10 and 11, Fig. 18 is a fragmentary side elevational view of a balancing ring having the central portion thereof in the form of a series of reversed bends to increase the weight, Fig. 19 is a view similar to Fig. 18 of a balancing ring having a pair of circumferentially spaced loop portions to receive an arcuate bar part, Fig. 20 is a perspective view of the arcuate bar shown in Fig. 19, Fig. 21 is a cross-sectional view taken on line XXI—XXI of Fig. 19, Fig. 22 is a view similar to Fig. 18 of a further modified form of balancing rings having a central portion in the form of a coil, Fig. 23 is a view similar to Fig. 8 of a modified form of balancing ring structure showing an adjustable weight attached thereto, Fig. 24 is a cross-sectional view taken on line XXIV—XXIV of Fig. 23 showing the adjustable weight in position, and Fig. 25 is a partial vertical cross-section of a wheel assembly having a fairing carrying the balancing ring.

For the reason that the improved balancing ring of the present invention has been specifically designed to be used upon automobile wheels of the type in present use, the various forms of the invention have been illustrated in connection therewith. It is to be understood, however, that the principles of the invention are not confined to the balancing of vehicle wheels or vehicle wheels of a specific type, but have general application wherever it is desirous to balance a rotating body and the body to be balanced embodies an annular portion upon which the resilient balancing ring may be snapped onto or into depending upon whether or not the resilient ring is being expanded onto or expanded into the annulus.

As shown in Fig. 1, the assembly to be balanced by the balancing ring 10 comprises a rim 12 supporting a pneumatic tire 14 with a brake drum 16 supported from the web 18 of the wheel. As illustrated, in Figs. 1 and 2, the rim 12 has the usual drop-center portion 20 to which the stamped out web portion 18 of the wheel is riveted at 22.

As more clearly shown in Fig. 3, the rivets 22 are located in circumferentially spaced groups. The rivets 22 as will be understood from Fig. 2, prevent the balance ring 10 from being removed from the position shown except in the event that the ring 10 is reduced in diameter so as to clear the heads of the rivets 22.

As shown in Fig. 4 the ring 10 may be of any desired cross section and is preferably of springy metal stock. The shaping of the ring 10 is so carried out that in unstressed state the end sections 24 and 26 are of a more acute radius than the central portion 28. By this arrangement at the time the ring is compressed as it is when it is positioned as shown in Figs. 1 and 2, the ring 10 will assume the shape shown in the dotted line position of Fig. 4 which is generally circular so that the ring 10 in the dotted line position approximates an arc of a circle. To increase the amount of out-of-balance condition that the ring 10 is capable of correcting, a central portion 30 of the ring 10 is shown offset and a body portion 32 of lead or other heavy material is shown secured thereon.

To balance the tire, wheel and brake assembly as shown in Fig. 1 with the ring 10, the assembly would be placed upon any suitable known balancing equipment and the extent and location of the out-of-balance determined. A balancing ring 10 of the correct weight would then be compressed and snapped into position behind the circle of rivets 22 with the resiliency of the ring 10 being relied upon to prevent the ring from shifting when in position. As a precaution against relative rotation of the ring 10 within the annulus defined by the web 18, one or both ends of the ring 10 may be turned out at right angles as at 34 so as to engage with the head or the rivet 22 to limit the movement in the event of relative rotation between the ring 10 and the wheel. In installing the ring 10 to balance the tire and wheel assembly, the center of mass of the ring 10 will be placed diametrically opposite the heavy unbalanced portion of the assembly.

In the form of the invention shown in Fig. 5, the balancing ring 36 is shown of plain construction without having attached thereto any weighted body portion and when compressed is only slightly more than semi-circular so as to locate the center of mass of the ring itself a maximum distance from the axis of rotation of the wheel. As shown in Fig. 6 the ring 36 when installed extends through an arc slightly more than 180° of the wheel.

Where the balancing ring is to be used in wheels having a stamped sheet metal web provided with stamped out portions offset from the drop-center portion of the rim, a ring of the contour shown in Figs. 4 and 5 is not desirable. As shown in Figs. 7 and 8 the ring 38 has offset portions 40 so as to bear against the flange 42 of the web 44 of the wheel between the offset portions 46 of the flange 42. The offset portions 46 result in openings 48 between the rim 50 and the stamped out web 44 so as to provide ventilation openings and openings for the attachment of emergency strap-on chains. In the constructions shown in Figs. 7 and 8 a relative shifting of the ring 38 is prevented through engagement of the offset portions 40 with the offset portions 46.

In Figs. 10 to 22 inclusive are shown various ways for providing a concentration of weight on the central portion of the balancing ring. In Fig. 10 the central portion of the balancing ring has a wavy contour at 52 offset inwardly from the remaining contour of the ring so as to receive a slotted weight 54 which may be of cast metal and is shown provided with a slot 56 having the bottom thereof corresponding to the wave 52 of the central portion of the balancing ring. It will be noted from Fig. 10 that the weight 54 when in position carries out the general outer contour of the ring. With the balancing ring in position the weight 54 can be neither shifted along the balancing ring or be displaced, due to the resiliency of the ring itself within the annulus of the wheel.

In Fig. 12 the central portion of the balancing ring is shown provided with an offset 58 having slightly arcuate portions 60 which are adapted to be sprung into corresponding arcuate recesses 62 of the weight 64. The resiliency of the ring will hold the weight 64 in the position shown in Fig. 12.

In Figs. 14 to 16 is shown a form of construction quite similar to that shown in Figs. 12 and 13 with the exception that the offset portion 66 of the balancing ring is provided with relatively straight sides 68 to be received in corresponding slots 70 of the weight 74. With this arrangement the resilient action of the balancing ring in the annulus in which it is inserted will prevent the weight 74 from being displaced from the offset 66.

The form of the invention shown in Figs. 16 and 17 comprises a balancing ring of the type shown in Fig. 5 having a flat central portion 76 upon which slotted weight 78 of lead or other easily distortable material is clamped into position in a manner quite similar to that of a lead weight upon a fishing line.

In Fig. 18 is illustrated one simple manner in which the center of mass of the balancing ring may be shifted and the weight of the ring increased with the same size of stock. As shown the central portion of the balancing ring, which may be of the type shown in Fig. 5, is provided with a series of reverse bends 80. In Fig. 21 a similar result had been accomplished by providing a coil in the central portion of the ring as at 82.

In the form of the invention illustrated in Figs. 19, 20 and 21, the central portion of the balance ring has been shaped to provide a pair of circumferentially spaced loops 84 in which an arcuate bar 86 constituting a weighted body may be inserted and made a part of the balance ring.

It will be understood that the weights 78 and 86 will be of varying sizes to take care of different degrees of out-of-balance with the proper size weight being selected to balance the particular wheel assembly. For balancing vehicle wheels at the assembly line in automobile plants, the balancing rings of Figs. 4, 5, 10, 12, 14, 18 and 22 may be conveniently made up in different weights for balancing out-of-balance conditions of one-half ounce, one ounce, two ounces, three ounces, four ounces, etc. For example, by increasing the thickness of the wire from which the balancing ring of Fig. 5 is made up, plain rings for balancing one-half ounce, one ounce, one and a half ounce, two ounce and three ounce out-of-balance conditions may be conveniently provided. At the balancing station in the assembly line, the operator would balance the tire, wheel and brake drum assembly and indicate the number of ounces of "out-of-balance" and the location of the heavy portion of the assembly. A balancing ring would then be selected and snapped into position within the annulus of the assembly of the size that would counter-balance the out-of-balance condition. In balancing vehicle wheels in service, the construction shown in Figs. 10, 16 and 19 permitting the use of variable size weights in connection with the balancing ring, would be found more desirable as it would prevent the service garage from carrying a large assortment of balancing rings.

Shown in Figs. 23 and 24, is a different form of balancing ring 88 having arcuate end portions 90 and a central offset portion 92 extending through an arc of approximately 90 degrees. Supported upon and adjustable along the offset portion 92 are weights 94 of split construction and having a clamp screw 96 for clamping the weight 94 upon the offset 92. It should be readily understood that, by moving the weight 94 toward and away from each other upon the offset 92, the counter-balancing effect of the ring 88 may be varied. As shown, the ring 88 is of resilient material with the end portions 90 snapped in between the rivet circle 22 and the web of the wheel in a manner more fully illustrated in Figs. 1, 2 and 3.

In Fig. 25 the tire and wheel assembly is provided with a fairing 98 shaped to provide an annular recessed portion 100 into which the balancing ring 102 is shown in position for balancing the wheel and fairing assembly. The balance ring 102 may be any one of the numerous forms heretofore described in detail. This illustrated installation of a balancing ring into the fairing of the tire and wheel assembly is merely to show one of many possible manners and methods of installing the balance ring for balancing the rotated out-of-balance structure.

It is to be understood that the balance ring of the present invention may consist of a plain ring such as shown in Figs. 5 and 7 or may consist of a plain ring with a weight attached thereto as shown in Figs. 4 and 10, for example. For instance, the ring shown in Fig. 7 which may be formed entirely from spring wire stock, might be of such a gauge as to balance an out-of-balance condition of one ounce. Where an out-of-balance of two ounces exists the ring of Fig. 7 would then carry a one ounce weight 104 as shown in Fig. 8, the weight 104 being attached to the body of the ring 38 in any suitable manner such as being molded in position, welded, crimped, etc.

Having thus described my invention, what I desire to secure by Letters Patent and claim is:

1. A balancing ring for drop-center rims of the construction described comprising an arcuate member of springy wire stock having a central portion of one radius and end portions of lesser radius in an unstressed state, said member upon being compressed, being generally circular and adapted to be disposed between the rivet circle and the web of the wheel, said member when stressed into the arc of a circle defining an arc greater than 180° and substantially less than 360°, whereby when in said arc its center of mass is disposed materially to one side of the center of such circle.

2. A balancing device for wheels or the like adapted to be carried upon a circular portion of the wheel body comprising a split ring of springy material which in its unstressed state has a central portion of one radius, and end portions of lesser radius whereby upon being stressed the same will conform to the circular shape of the wheel portion, said ring when stressed into the arc of a circle defining an arc greater than 180° and substantially less than 360°, whereby when in said arc its center of mass is disposed materially to one side of the center of such circle.

3. An arcuate spring balancing weight of unitary construction adapted to be snapped into the annulus of the vehicle wheel for balancing the same, said weight when stressed to an arc of a circle having its center of mass materially disposed to one side of the center of such a circle.

4. A balancing weight for wheels consisting of an arcuate piece of resilient material of uniform cross section and of such a shape and proportion to define slightly more than a semicircle when snapped into the annulus of the wheel.

5. An arcuate spring balance weight adapted to be snapped into the annulus of a vehicle wheel for balancing the same, said weight when stressed into the arc of a circle defining an arc greater than 180° and substantially less than 360°, whereby when in said arc its center of mass is disposed materially to one side of the center of such circle.

TOWNSEND F. BEAMAN.